Oct. 27, 1970   H. SPODIG   3,537,048
PERMANENT MAGNET DEVICE FOR HOLDING OR CONVEYING PURPOSES
Filed Aug. 7, 1968
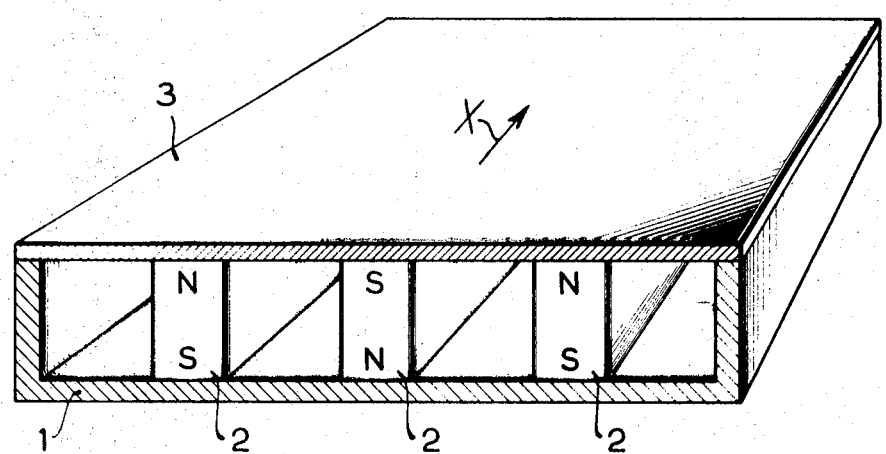
INVENTOR
HEINRICH SPODIG
By: Michael S. Striker
Attorney

United States Patent Office 3,537,048
Patented Oct. 27, 1970

---

3,537,048
PERMANENT MAGNET DEVICE FOR HOLDING OR CONVEYING PURPOSES
Heinrich Spodig, 84 Netteberge, 4711 Bork, Germany
Filed Aug. 7, 1968, Ser. No. 750,917
Claims priority, application Germany, Aug. 9, 1967, 1,614,579
Int. Cl. H01f 7/20
U.S. Cl. 335—285
5 Claims

ABSTRACT OF THE DISCLOSURE

Permanent magnet device for holding or conveying purposes comprising a support structure, a permanent magnet system arranged in said support structure, and a magnetic holding plate provided at at least one face of the device in magnetic contact with said magnet system, the material of said holding plate and its active magnetic cross-section being such relative to the magnetic flux emanating from said magnet system that a magnetic stray flux arises from said plate over and above its magnetic saturation and that a partial magnetic short circuit is effected by said plate, metallic articles placed on said plate being included in said short circuit.

CROSS REFERENCES TO RELATED APPLICATIONS

Concurrently with the present application, two additional applications of the same inventor are being filed relating to "Endless Magnetic Conveyor" (Ser. No. 750,-918) and "Permanent Magnet Holding Device" (Ser. No. 750,834) respectively.

BACKGROUND OF THE INVENTION

The invention relates to a permanent magnet system for holding and conveying purposes which comprises a magnet system having a plurality of poles of alternating polarity and a holding member applied thereto. The holding member in the conventional device is of nonmagnetic material in order to avoid that a magnetic short-circuit of the magnet system occurs across the holding member which would cancel out the magnetic flux and thus the holding action. The nonmagnetic holding member is penetrated by the magnetic lines of force and ferromagnetic articles placed on the holding member to be held in place thereon or to be moved therewith will thus form the return conducting means for the magnetic lines of power. Depending on the mass of iron and its relation to the flux of the magnet system the ferromagnetic articles will receive a partial or complete magnetic saturation. The magnetic attraction is effected therefore without direct contact between the article and the magnets. The magnetic lines of force accordingly must bridge the distance resulting from the thickness of the holding member and its distance from the magnet system. Because of this interferricum there exists an only partial use of the available coercive force of the system. The magnet system must therefore be provided for with greater force than would be necessary for the holding power actually required.

SUMMARY OF THE INVENTION

It is an object of the present invention to avoid these shortcomings of present permanent magnet holding devices and to provide for a better utilization of the magnetic flux of the permanent magnet system. This is accomplished by a permanent magnet device which comprises a support structure, a permanent magnet system arranged in said support structure, and a magnetic holding plate provided at at least one face of the device in magnetic contact with said magnet system, mass and volume of said holding plate and its active magnetic cross-section being such relative to the magnetic flux emanating from said magnet system that a magnetic stray flux arises from said plate over and above its magnetic saturation and that a partial magnetic short circuit is effected by said plate, material articles placed on said plate being included in said short circuit.

The holding member of this device is of a magnetic material and is selected so as to have an active cross-section relative to the lines of force emanating from the magnet system adequate to a magnetic stray flux or field of force over and above its magnetic saturation. The holding member thus is in direct magnetic contact with the magnet system and effects a partial magnetic short-circuit. It is furthermore in direct magnetic contact also with the article placed theeron. Accordingly the magnetic field of force or stray flux of the holding member is magnetically short-circuited across the article to be held. The article is therefore included in the existing partial short-circuit. Since the magnetic flux reaches its optimum magnitude in a magnetic short, the best conditions thus prevail for effecting the holding action. This implies a better utilization of the applied magnetic energy and a better adaptation of such energy to the general objects of the device.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single figure shows, in perspective and in diagrammatic form, a device according to the invention.

DESCRIPTION OF THE PREFERRED EMBODIMENTS

Referring to the drawing it will be seen that there is provided an open-faced box 1 in which there are placed permanent magnets 2 so as to present alternating polarities at their active surface. A holding member 3 is provided at the open face of the box forming the closure thereof. The holding body is in reach of the magnetic field of the magnetic force set up by the permanent magnets. It consists of magnetic material of a type and has a mass and volume to effect an only partial short-circuit of the magnetic poles. A magnetic field of force or stray flux will thus form on top of the holding member 3. Articles placed on the holding member will enter into magnetic contact therewith which contact will include the magnetic stray field and the articles thus will form part of the existing partial magnetic short-circuit. Holding member and article thus practically form one unitary magnetic body.

This is in distinction from the prior art structures where the holding body of nonmagnetic material does not form a magnetic circuit with the article to be held and even constitutes a separating element of its own between the article and the magnets. In the device of the invention this action is exactly reversed in that the holding body 3 forms part of the magnetic short circuit resulting in a better yield of the magnetic flux and an improvement of the energy of the system.

While the embodiment illustrated shows the holding body 3 rigidly attached to the box 4 in form of a magnetic slab, the holding member can also be arranged movably relative to the magnet poles in the direction of the arrow X and can then perform the function of a conveyor belt as customary in magnet conveyors. In that case the holding member 3 would be formed as an endless sheet metal strip which revolves about the magnet system.

It will be understood that each of the elements described above, or two or more together, may also find a useful application in other types of constructions differing from the types described above.

While the invention has been illustrated and described as embodied in a permanent magnet device for holding or conveying purposes, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is:

1. A permanent magnet device for holding or conveying purposes comprising a stationary support structure of magnetizable material; and permanent magnet system comprising a plurality of permanent magnets extending spaced from each other and each contacting with one end thereof said support structure, the contacting ends of adjacent permanent magnets having different polarity and said magnet system producing a magnetic flux of predetermined size; and a holding plate of magnetizable material arranged with one face thereof in direct magnetic contact with the other ends of said permanent magnets, said holding plate having a cross-section such that the predetermined magnetic flux produced by said magnet system is greater than necessary for magnetic saturation of said plate so that a magnetic stray flux is produced over the other face of said plate, whereby magnetizable articles placed on said other face will be held thereon by the magnetic force produced by said stray flux.

2. The permanent magnet device of claim 1, wherein said support structure has a U-shaped cross-section comprising a base and a pair of substantially upright flanges integral with said base, each of said permanent magnets abutting with said one end thereof against said base and the upper ends of said flanges being arranged in one plane with the other ends of said magnets, said holding plate being also in direct magnetic contact with said upper ends of said flanges.

3. The permanent magnet device of claim 1, wherein the holding plate is rigidly affixed to said support structure.

4. The permanent magnet device of claim 1, wherein the holding plate is movably supported on said support structure and said permanent magnets.

5. The permanent magnet device of claim 1, wherein the holding plate is in the form of a movable sheet metal strip.

References Cited

UNITED STATES PATENTS

| | | | |
|---|---|---|---|
| 2,489,264 | 11/1949 | Byrd | 209—223 XR |
| 2,510,634 | 6/1950 | Hull | 335—285 |
| 2,707,557 | 5/1955 | Spodig | 209—223 |
| 2,958,019 | 10/1960 | Scholten et al. | 335—285 |

GEORGE HARRIS, Primary Examiner

U.S. Cl. X.R.

335—306